May 21, 1968  G. W. B. BORUP  3,384,521

METHOD AND APPARATUS FOR MAKING NON-WOVEN FABRICS

Filed Sept. 22, 1964  2 Sheets-Sheet 1

INVENTOR
Gustav William Bilgrav Borup
BY
ATTORNEY

May 21, 1968 G. W. B. BORUP 3,384,521
METHOD AND APPARATUS FOR MAKING NON-WOVEN FABRICS
Filed Sept. 22, 1964 2 Sheets-Sheet 2

INVENTOR
Gustav William Belgrau Borup
BY Karl W. Flocks
ATTORNEY

United States Patent Office 3,384,521
Patented May 21, 1968

3,384,521
METHOD AND APPARATUS FOR MAKING
NON-WOVEN FABRICS
Gustav William Bilgrav Borup, Tovesvej 8A,
Naerum, Denmark
Filed Sept. 22, 1964, Ser. No. 398,302
Claims priority, application Denmark, Sept. 23, 1963,
4,466/63
6 Claims. (Cl. 156—161)

ABSTRACT OF THE DISCLOSURE

A method and apparatus for forming fabrics of thermoplastic threads with the warp threads passing over an inclined heated surface with the cross-threads applied thereto and sufficient heat applied to form droplets of previously applied adhesive to run down to the intersections of the threads and upon cooling attach the threads at these intersections to form the fabric.

Figure 1:
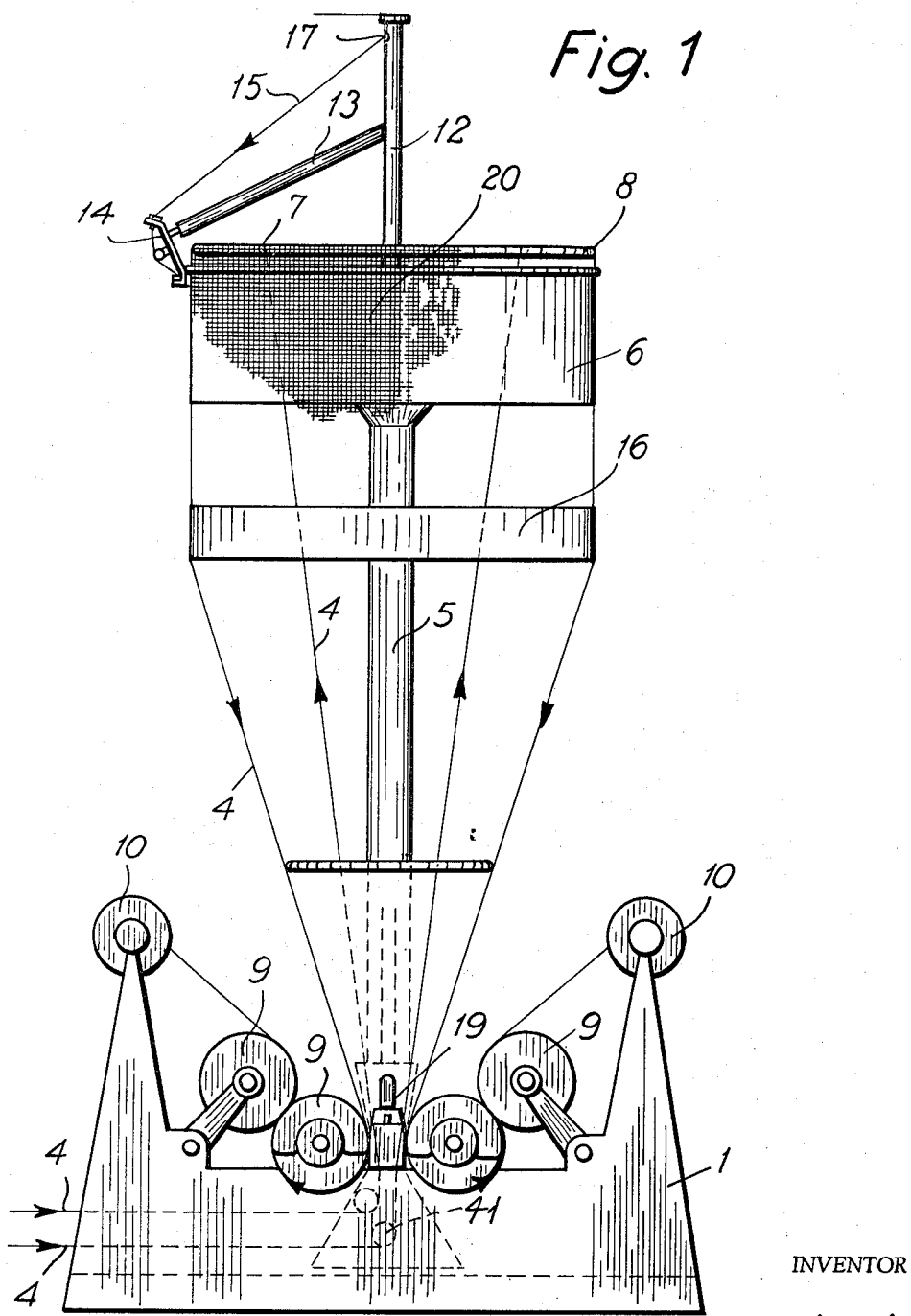

The present invention relates to a method and a machine for manufacturing wire netting consisting of intersecting warp and cross threads united at the points of intersection.

It is known for many purposes, but in particular for reinforcement of wrapping paper to use such nettings generally made from plastic threads united with one another by welding. The production of such nets is difficult because the welding has to be made in such a manner that the threads proper are not damaged or entirely destroyed. On account hereof the procedure is onerous and the product becomes relatively expensive.

The present invention has for its main object to indicate a method which results in a quick and reliable production of the netting thereby bringing the costs down to a reasonable level.

A further object is to enable the use of threads made from many different materials, such as plastics, textile threads, glass wool, monofibres, wire, and paper formed as threads or tape.

These objects are in accordance with the invention achieved in that at least one set of threads are coated with a well known thermoplastic binding agent, solid at the temperature at which the netting is to be used but assuming a liquid or adhesive state by heating, whereupon the threads are mutually arranged to form a network on a bed which may be heated thereby performing the welding or gluing together.

Considerable savings according to the invention will be achieved in the consumption of binding agent by stretching the cold warp threads coated with binding agent in vertical positions on a vertically orientated surface on an upright standing bed where after the cross threads are stretched on the bed practically in horizontal position on top of the warp threads so that the binding agent by touching the bed is heated to a degree sufficient to liquify the binding agent and make part of this run down along the vertical threads and gather in the shape of drops or lumps at the places of intersection by the cross threads.

Hereby it is achieved that most part of the binding agent or all of it will gather in the drops or lumps formed and deposited on the places of intersection, so that no more binding agent will be required than what is necessary to bind the warp threads and the cross threads together.

The coating of the threads can be performed in many ways well known in the art, as for instance immersion of the threads into a bath containing the thermoplastic material in a fluid state. This procedure can be used in making threads of all the kinds named above ready for being treated in the present method and in the present machine.

A particularly simple application of the present method according to the invention may consist therein to arrange the warp threads like the generatrixes of a cylindrical surface on a cylindrical ring-shaped bed that may be heated while the cross threads be laid like the windings in a helical line encircling the warp threads on the cylindrical surface. By pulling the threads thus placed down on the cylindrical bed or base step by step a hose-like netting may be produced quickly, and the hose or tube may then be cut up into one or more strips.

The method is particularly suitable for production of such netting on a large scale.

The machine according to the invention consists of a cylindrical sheet-ring fixed on top of a framework over a distributor for warp threads. These threads are to be led up through the ring and down on the external outside of the same. The framework further serves as a bearing for one end of a revolving arm above extending from the axis of the ring in such a manner, that the free end of the arm extends to a point just outside the external surface of the cylindrical ring and provided with guiding organs for a cross thread fed to the arm.

The arm is mounted on top of a pillar fixed in the framework and connected to a drive mechanism comprising reversible gearing and connected with a motor driven arrangement of pulling off rollers for pulling the netting formed on the ring down and away from the machine.

By leading the warp threads to the distributor from a bobbin holder and by leading the cross threads from a cross thread bobbin the machine will during operation produce a continuous netting due to the fact that the threads placed on the cylindrical sheet ring slowly will be pulled downwards by the pulling off rollers.

It is advantageous to cut up the tubular netting produced into strips before leaving the machine. For this purpose the machine has stationary mounted knives cutting in the axial direction of the tubular netting leaving the ring, hereby forming strips of netting.

One embodiment of the machine according to the invention is shown in the drawing.

FIG. 1 schematically shows the machine in side elevation.

Figure 2:
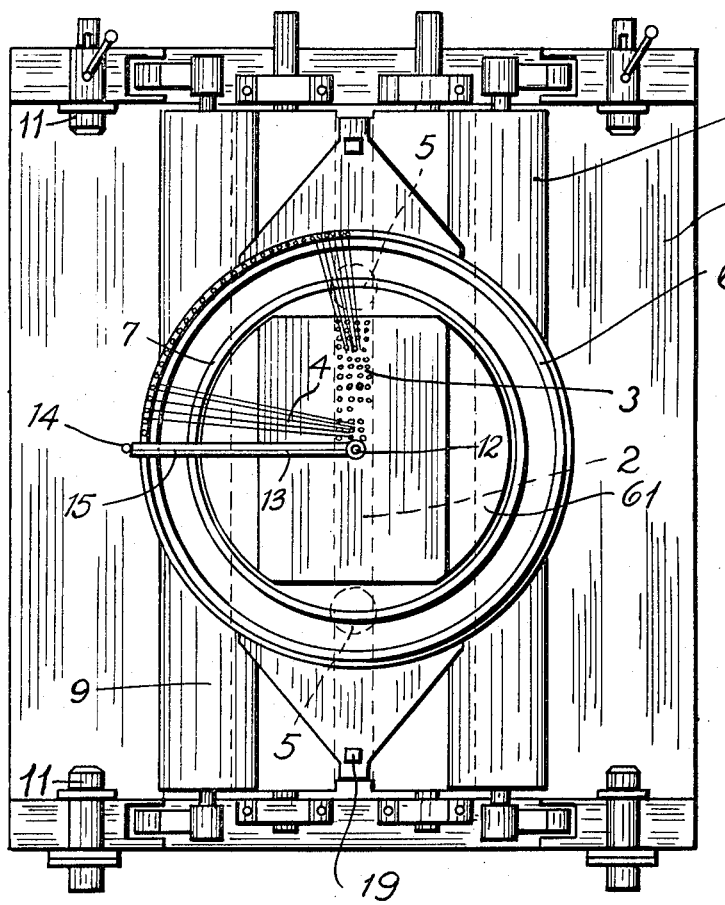

FIG. 2 schematically the same viewed from above, and

Figure 3:
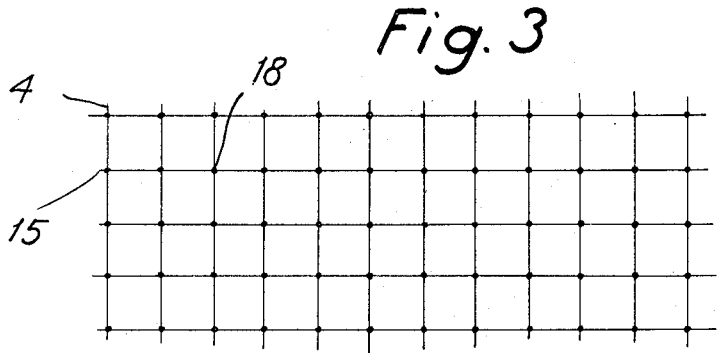

FIG. 3 an enlargement of a small piece of the netting produced.

In order to make the drawing as simple and clear as possible all such machinery parts as motors and gearings for performing movement of the working parts and transmission of power and which are deemed to be well known in the art as well regarding their construction per se as regarding the obvious way, in which they must be incorporated in the machine, are not shown on the drawing, but it is to be understood, that such parts, although they do not constitute means for which special protection is applied, must be installed for finishing the construction.

The machine has a frame 1 carrying a thread guide 2 with guiding holes 3 for the warp threads 4, which from a bobbin holder not shown over guides 41 is fed to the thread guide 2 and upwards through the holes 3 of this. The frame 1 further supports posts 5 carrying a sheet ring 6 formed as a cylinder and made of copper, and which on the inner side is fitted with electric heating devices 61, making it possible to heat the ring to an adjustable temperature.

The sheet ring 6 is mounted in such a manner that it has a vertical axis pointing down towards the center of the thread guide 2. Inside the sheet ring 6 an annular thread guide 7 is mounted. Further a thread guide 8 which may for instance be made by bending the upper edge of the ring 6 is located right up to the upper edge of the ring 6. The warp threads 4 are led from the thread guide 2 up past the annular thread guide 7 and further out past the thread guide 8 down along the sheet ring 6 and further down to the pulling off rollers 9 and the make up rollers 10 situated in the frame 1 and driven by motors not shown which respectively pull the warp threads from the sheet ring 6 and make up or wind the netting produced onto bobbins.

In FIG. 2 the make up rollers are shown dismantled so that only the studs 11 onto which an empty bobbin may be mounted and from which an empty bobbin may be removed are visible.

Coaxially with the sheet ring 6 the machine has a vertical pillar 12 carrying an arm 13 extending beyond the ring 6 and carrying a thread guide 14 for a cross thread 15, which from a bobbin not shown is fed to the central pillar 12 and from here to the thread guide 14 at the end of the arm 13 right off the end of the sheet ring 6. The pillar 12 and thereby the arm 13 can be set into a rotary movement.

The apparatus is made ready for use the way that the warp threads coated with a thermoplastic binding agent, which is solid at the temperature at which the netting is to be used, i.e. generally at room temperature but which will become liquid or adhesive by heating, are led through the thread guide 2 up around the sheet ring 6 and a guide ring 16 to the pulling off rollers 9. Further a cross thread 15 is led to a thread guide 17 at the end of the pillar 12 and from there onwards through the thread guide 14 at the end of the arm 13. Further the sheet ring 6 is heated to a temperature at which the thermoplastic binding agent coating the warp threads 4 will be adhesive or liquid. It is therefore possible to make the end of the cross threads 15 fast on some of the warp threads simply by pressing them firmly onto these. Now the machine is started, that is to say, the arm 13 and the pulling off rollers are set rotating. The pulling off rollers will pull the warp thread stretched against the sheet ring 6 downward. Simultaneously the arm 13 will revolve around the sheet ring 6 depositing the cross thread 15 on this in a helical course with a pitch corresponding to the distance the warp thread is pulled down while the arm 13 makes one turn. By being in this manner exposed to the heat from the sheet ring 6 the now liquified binding agent with which the warp is coated will run down the warp threads and will gather as small drops or lumps 18 on the points of intersection of the warp threads and the cross threads. The sheet ring 6 is of such proportions in relation to the pulling off ratio that the time during which the threads are in contact with the sheet ring 6 will be sufficient for heating the binding agent to a point where it is sufficiently liquid to become adhesive so that it will stick the warp threads and the cross threads together. The threads are kept close together due to the fact that they have to be pulled over the guide ring 16 thereby ensuring that they have been glued in the position wanted. During the passage down over the sheet ring 6 the above mentioned running down of the binding agent along the warp threads 4 is taking place for the formation of drops or lumps 18 which particularly contributes to keep the threads together at the points of intersection.

For making up of the netting produced in the form of flat strips on the make-up rollers 10, knives 19 have been provided on the frame 1 in such a manner that they perform running cuts in the tubular network, hereby dividing the net into strips. In the embodiment shown two such knives are used, one on either side of the machine so that two strips are formed and made up, each on its own make-up roller 10.

I claim:
1. Method for the manufacture of non-woven fabrics consisting of two sets of threads of thermoplastic material intersecting each other and united at the points of intersection comprising
    coating one set of said threads with a binding agent of thermoplastic material which is solid at the temperature at which the netting is to be used and which will become adhesive by heating,
    stretching said one set of threads upon an inclined bed so that each of said threads is inclined to the horizontal,
    laying the other set of threads across said one set,
    and heating said bed sufficiently to liquify said binding agent to allow part of same to run down said inclined threads and to gather at the points of intersection of the threads.
2. Method according to claim 1 wherein said bed is vertical, and wherein said coated threads are stretched vertically upon said bed.
3. A machine for the manufacture of non-woven fabrics from two sets of threads of thermoplastic material comprising
    a frame,
    a cylindrical sheet ring mounted above said frame,
    a distributor means located below said ring to direct warp threads coated by an adhesive of thermoplastic material up through said ring and down on the outer side forming generatrixes of said ring,
    a radial arm supported from said frame and mounted to revolve above said ring,
    said radial arm having a free end which extends over the outer side of said cylindrical ring and having a guiding means for a weft thread fed to said arm,
    and means to heat said ring.
4. The machine of claim 3, further characterized by roller means mounted on said frame below said sheet ring to pull the fabric produced from said sheet ring.
5. The machine of claim 4, further characterized by means to cut into strips the fabric leaving said ring in tubular form mounted on said frame adjacent said roller means.
6. The machine of claim 3, further characterized by a guide means located below said ring in the form of a ring concentric to said cylindrical sheet ring.

References Cited
UNITED STATES PATENTS

| | | | |
|---|---|---|---|
| 2,797,728 | 7/1957 | Slayter et al. | 156—175 |
| 2,698,045 | 12/1954 | Runton et al. | 156—431 XR |
| 3,164,509 | 1/1965 | Olken | 156—174 XR |
| 2,725,090 | 11/1955 | Runton et al. | 156—426 |
| 3,239,401 | 3/1966 | Beery | 156—179 |

EARL M. BERGERT, *Primary Examiner.*

PHILIP DIER, *Examiner.*